Patented July 28, 1925.

1,547,299

UNITED STATES PATENT OFFICE.

EUGÈNE CASLANT, OF PARIS, FRANCE.

MEANS FOR OBTAINING RELIEF EFFECTS IN MOTION PICTURES.

Application filed January 27, 1922. Serial No. 532,326.

*To all whom it may concern:*

Be it known that I, EUGÈNE CASLANT, a citizen of the French Republic, residing at Paris, in the Republic of France, have invented new and useful Improvements in Means for Obtaining Relief Effects in Motion Pictures, of which the following is a specification.

This invention relates to a method for obtaining relief which is based upon the following conditions as determined by the inventor. During one second (that is during the progress of sixteen images) the optical axis of the camera apparatus used for taking the motion pictures describes a cone having a point in the object as the apex and as the base a spiric curve or a combination of spirics or a curve of similar form to the above-mentioned curves or combinations of curves; moreover the optical chamber is caused to turn or roll about said optical axis with a slight alternating movement preferably at four periods per second. By the above method, there will be produced in the projection of the images obtained by this movement of the optical chamber and fed in succession by the known methods, by reason of psycho-physical laws, a certain effect of relief resulting in a separation of the planes of the images and a plastic effect, that is, images of a finer character with rounded outlines and improved dispositions of the values thereby obtaining views of a more attractive character. The shades, variations, intensities, qualities and other properties of the relief will depend upon the curve which is selected and upon the character and the number of the combinations of curves employed. Should certain conditions be suppressed, such for instance as the rolling movement of the optical chamber, a certain relief will still be obtained, but in a smaller degree. The movements can be obtained by the means afforded by the usual mechanical principles in various manners.

The accompanying drawing shows by way of example diagrammatic views of an apparatus embodying the above mentioned method, wherein.

Figure 1:
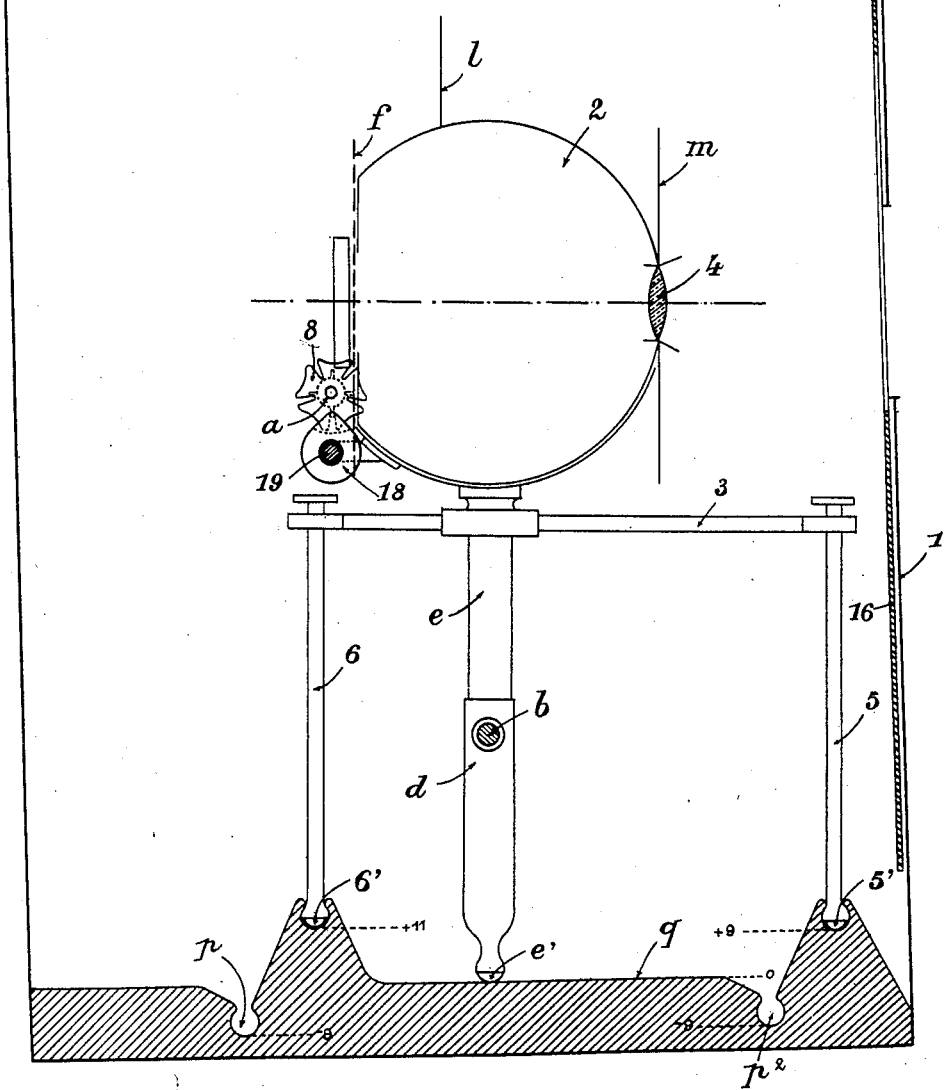
Fig. 1 is an elevational view of the apparatus, enclosed in a camera used for taking views, embodying a partial section along the line A B C D of Fig. 2.
Figure 2:
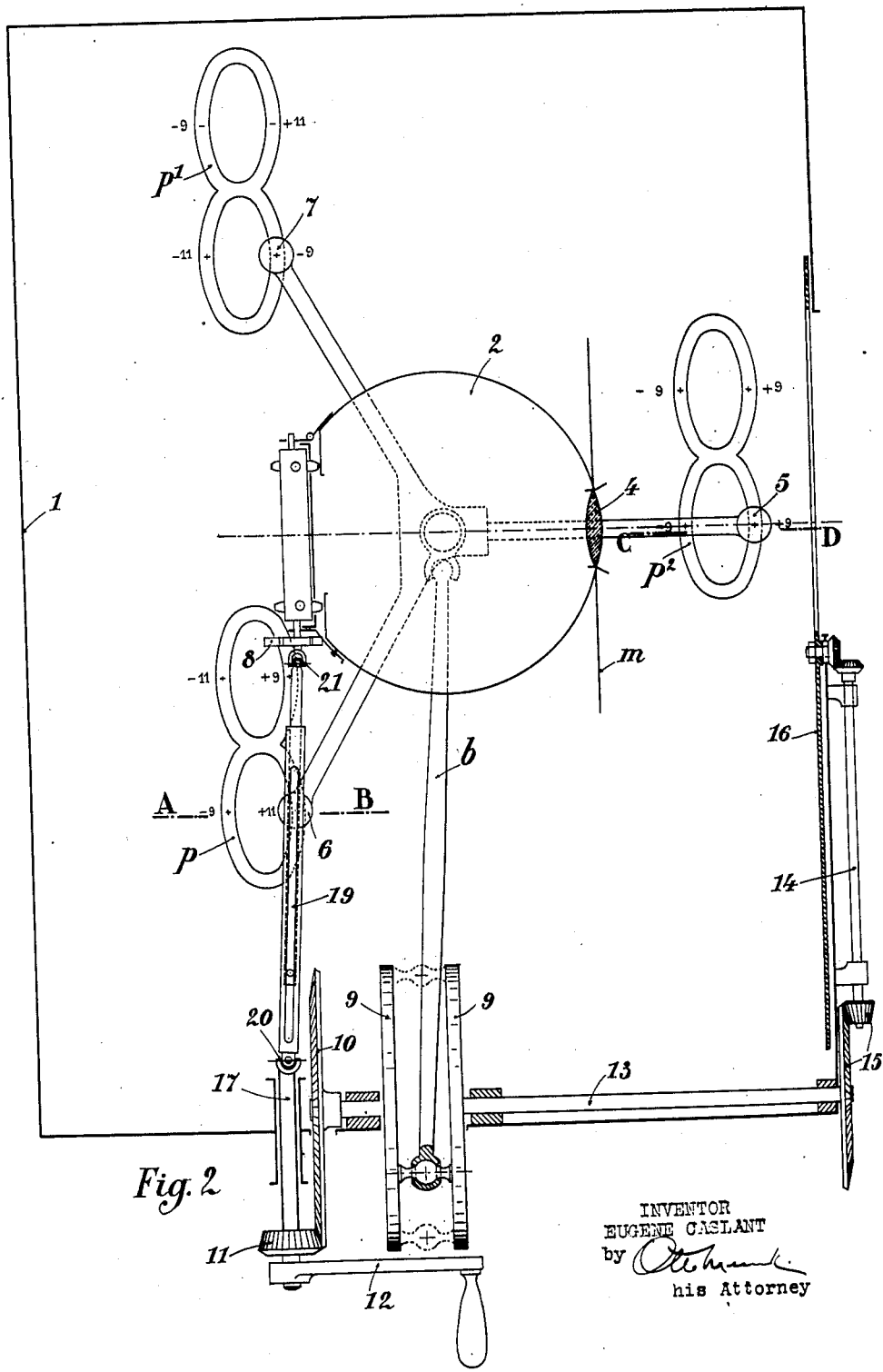
Fig. 2 is a corresponding plan view showing the guiding grooves for the uprights of the support.

As shown in the drawing, the apparatus being disposed in a camera 1 the optical chamber 2 of said apparatus has the form of a sphere or an ellipsoid and is disposed upon a support or carriage 3 having three uprights 5, 6, 7 each provided at its end with a bearing ball $5'$, $6'$, $7'$. The objective 4 is of the type employed in the known motion picture apparatus. The roller $a$ is actuated by any known means comprising for instance a Maltese cross 8 and serves to drive the film $f$. $l$ and $m$ indicate screens serving to cut off the light. The support 3 is also provided with a central foot $e$ having the tube $d$ loosely mounted thereon, said tube $d$ carrying a pin $c$ which receives the end of the actuating rod $b$; by importing an alternating movement to said rod, the support is caused to follow the desired path as will now be explained.

The balls $5'$, $6'$, $7'$ roll in guiding grooves such as $p$, $p'$, $p^2$, whereof the path is determined by the curve laid out according to the above mentioned principle. The dimensions and the relative size of the said grooves will depend upon the relief which it is desired to obtain. The numerals in the drawing indicate in millimetres and by way of example the levels of various portions of the grooves with respect to the horizontal plane marked $q$, upon which the roller $e'$ is adapted to roll.

In order to obtain a conical movement of the optical axis, the paths traversed by feet $6'$ and $7'$ are somewhat larger than the path of the foot $5'$ and the greater the relative dimensions of the paths of $6'$ and $7'$ compared with that of $5'$, the less is the distance of the apex of the cone from the base.

In order to produce the oscillation of the optical chamber about the optical axis, different levels are given to the similar parts of the grooves as shown; when $7'$ is at $-9$, $6'$ is at $-11$ and $5'$ at $-9$ whereby $6'$ is lower than $5'$ and $7'$; when $7'$ is at $+11$ $6'$ is at $+9$ and $5'$ at $+9$ whereby $5'$ and $6'$ are now on the same level and $7'$ above said level. It will be seen that the respective positions taken up by the upright $5'$, $6'$, $7'$ relatively to the plane $q$ during a complete cycle result in giving the optical chamber 2 a slight angular or oscillating movement about the optical axis.

The outer end of the rod $b$ is journalled between two crank-discs 9 of which the rotation is obtained through the medium of two conical pinions 10 and 11 actuated by an outer handle 12 with the facultative interposition of suitable gears. The shaft 13 for the crank discs 9 drives an intermediary shaft 14 by the pinions 15, said shaft controlling in turn the rotation of the inner shutter 16.

The shaft 17 for the pinion 11 is adapted to drive the disc 18 of which the stud controls the Maltese cross 8, through the medium of the telescopic rod 19 of which the ends are connected by universal joints 20 and 21 respectively to said shaft 17 and to the shaft of said stud carrying disc.

The synchronism and the proper operation of the different parts of the system are obtained by judiciously selecting the relative dimensions of the various gears; auxiliary gears may be added, the means shown in the drawings being given only by way of indication.

The motion of the optical axis may be also carried out in the above-indicated conditions by the use of the general method employed in mechanics for obtaining any desired movement, that is, by projecting the curve or the combinations of curves selected for the purpose upon the three axes or the three planes of co-ordinates, and to cause these three projections to be described by three superposed supports or carriages. The first carriage is actuated by a cam; the second is situated upon the first carriage and is actuated by a cam controlled by a square shaft; the third is disposed upon the second carriage together with the cam thereof and is moved by means of two square shafts. The rotary movements to be communicated to the axes of rotation of the spheroidal chamber are obtained by the use of flexible cables or universal joint power transmission devices.

Having now described my invention, what I claim as new and desire to secure by Letters Patent is:

1. A method for obtaining relief effects in motion picture views which consists in causing the optical axis of the camera for taking views to describe a conical surface having a point in the object as the apex and a combination of spiric curves as the base.

2. A method for obtaining relief effects in motion picture views which consists in causing the optical axis of the camera for taking views to describe during each second a conical surface having a point in the object as the apex and a combination of spiric curves as the base.

3. A method for obtaining relief effects in motion picture views which consists in causing the optical axis of the camera for taking views to rapidly describe a conical surface having a point in the object as the apex and a spiric curve as the base.

4. A method for obtaining relief effects in motion picture views which consists in causing the optical axis of the camera for taking views to rapidly describe a conical surface having a point in the object as the apex and a combination of spiric curves as the base and the optical chamber to roll about said optical axis with a slight alternating movement.

5. A method for obtaining relief effects in motion picture views which consists in causing the optical axis of the camera for taking views to describe during each second a conical surface having a point in the object as the apex and a combination of spiric curves as the base, and the optical chamber to roll about said optical axis with a slight alternating movement at four periods per second.

6. An apparatus for obtaining relief effects in motion picture views comprising a chamber, a support provided with feet for said chamber for taking motion picture views, guiding members for said feet having the shape of a spiric curve in horizontal and in vertical projection and means for displacing the chamber so that the feet move along the said guiding members.

In testimony whereof I have signed my name to this specification.

EUGÈNE CASLANT.